United States Patent [19]  [11]  4,324,193
Cutler  [45]  Apr. 13, 1982

[54] METHOD FOR SNUBBING OR RESTRAINING A CABLE

[75] Inventor: Christopher R. Cutler, Houston, Tex.

[73] Assignee: Exxon Production Research Company, Houston, Tex.

[21] Appl. No.: 50,406

[22] Filed: Jun. 20, 1979

[51] Int. Cl.³ ............................................. B63B 21/08
[52] U.S. Cl. .................................... 114/199; 242/149; 188/65.1
[58] Field of Search ............... 114/174, 180, 181, 199, 114/204, 205, 213, 215, 243, 244, 245, 247, 254, 268; 15/88; 104.4; 254/333, 389; 242/147 R, 148; 188/65.1, 65.2; 226/195

[56] References Cited

U.S. PATENT DOCUMENTS

| 458,855 | 9/1891 | Meinzer | 114/181 |
| 946,370 | 1/1910 | Kelmel | 15/88 |
| 1,498,048 | 6/1924 | Lee | 188/65.1 |
| 3,489,368 | 1/1970 | Rehwald | 242/147 R |
| 3,666,199 | 5/1972 | Mezzadri | 242/149 |

Primary Examiner—Edward R. Kazenske
Assistant Examiner—Jesús D. Sotelo
Attorney, Agent, or Firm—H. Elliott Cox

[57] ABSTRACT

A method for snubbing or restraining a cable. A cable is threaded through a sleeve which has brush bristle-like elements extending from the sleeve wall inwardly towards the center of the sleeve. The ends of the bristle-like elements are placed in contact with the surface of a portion of the cable and the frictional force resulting from the movement of the cable in contact with the bristle-like elements restrains movement of the cable through the sleeve.

8 Claims, 7 Drawing Figures

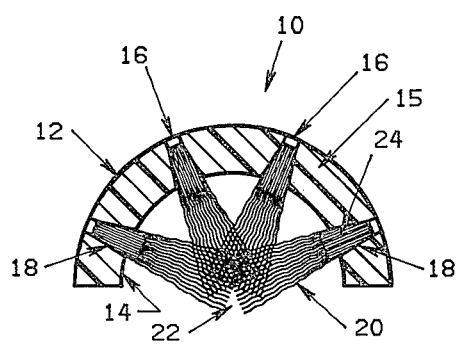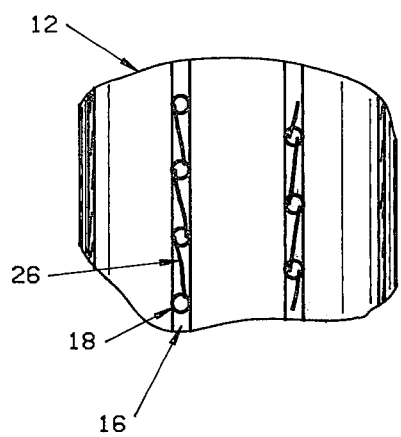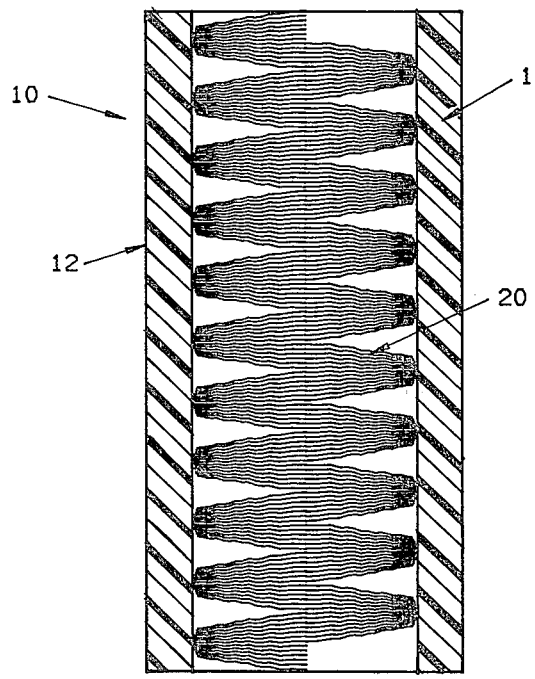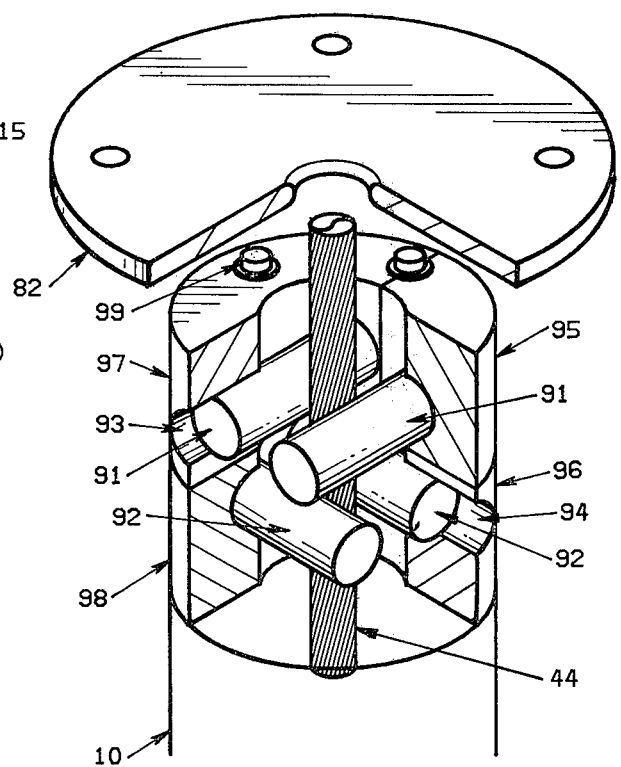
FIG. 1A
FIG. 1C
FIG. 1B
FIG. 5

METHOD FOR SNUBBING OR RESTRAINING A CABLE

BACKGROUND OF THE INVENTION

1. Field of the Invention

The present invention relates to cable snubbing. In particular the present invention is an improved method and apparatus for restraining or checking the motion of a cable used in the underwater positioning of a seismic source.

2. Disclosure of the Prior Art

In the practice of underwater seismic prospecting it is necessary to introduce beneath the water's surface a source of energy for inducing propagating acoustic waves. Generally it is desired that the source of energy, or seismic source, be positioned at a selected depth beneath the surface and maintained there during its operation. It is known in the art that one method for positioning a seismic source at a selected depth is to suspend the seismic source by one or more chains or cables beneath a float. The float is designed to remain buoyant at the water's surface while supporting the combined weights of the seismic source and the chains or cables connecting the float and the seismic source. Generally, one group of cables, the lifting cables, is used to lift and lower the float and seismic source from the deck of a ship into the water. Another group of cables, the support cables, is used to suspend the source beneath the float. When the source is in the desired underwater position, the weight of the source is borne by the support cables and the lifting cables are in a substantially no load condition.

To facilitate performing seismographic operations at several locations and to avoid removing the seismic source from underwater, it is common practice in underwater seismic prospecting to tow the float and submerged seismic source from one propsecting location to another. Towing is achieved usually by separate towing cables from the towing ship being affixed to the float and the seismic source. During a towing maneuver, the support chains remain taut but the submerged portions of the lifting cables experience a drag force as they move through the water causing the submerged portion of each lifting cable to increase. Even when the seismic source is not being towed, the wave motion causes the float to bob about such that the drag force on the submerged portion of the cable tends to pull the unsubmerged portion into the water. This reduces the amount of slack in the above surface portion of the lifting cables. Since the towing ship and the float heave and move relative to each other because of wave action, it is desirable to have slack in the above water surface portion of each lifting cable sufficient to allow for such motion and to prevent any tension from occurring in the above surface portion of the cable as the ship and float heave and move. Slack in the above water portion of the cable will prevent chafing or abrading of the float by the cable and will prevent breaking the lifting cable should the ship or float experience sudden movement relative to one another. To assure that sufficient slack remains in the above surface portion of a lifting cable, a means for checking or restraining the cable from further movement into the water is used. One such means is sometimes referred to as a cable snubber and is usually attached to the float.

The present invention is an improved method and apparatus for snubbing or checking the movement of a cable and includes using a sleeve member with flexible members extending inwardly from the sleeve wall to restrain a cable moving through the sleeve. A hollow casing with radially inwardly extending brushes is shown in U.S. Pat. No. 2,998,801 issued Sept. 5, 1961 to Arthur N. Edelberg, assignor to Kamco Products, Inc., Cleveland, Ohio. Edelberg's invention is a device for painting flagpoles or vertical suspension cables of suspension type bridges. It incorporates a casing with bristle brushes to seal the top and bottom ends of the casing from leakage of paint spray and to smooth the paint sprayed on the flagpole by paint spray guns as the device is lowered down the pole. Edelberg states that the brushes may be removed and replaced with wire brushes for removing loose paint, scale and rust from the flagpole or suspension cable about which it is raised and lowered. The Edelberg device appears to be unsuited for use in underwater prospecting applications. Further it is not a device for restraining the motion of the pole or cable with which it is used; rather it is clear from its intended use that the device moves rather easily and smoothly up and down the pole or cable to be painted.

U.S. Pat. No. 3,224,020 issued Dec. 21, 1965 to J. G. Domingos for a Golf Grip Cleansing Device discloses a cylindrical shell with cleansing brushes positioned in the upper interior portion of the shell and a quantity of water in the lower portion. The grip of a golf club may be inserted into the shell. Moving the grip up and down is said to remove perspiration, soil and other foreign material from the surface of the grip. The device would not be suited for or suggestive of a means for restraining the movement of a cable nor would it have any application to underwater mineral prospecting.

U.S. Pat. No. 3,335,469 issued Aug. 15, 1967 to Shand et al for Personal Safety Equipment discloses a device, referred to as a mobile safety anchor, which is intended to grip a safety line upon sudden acceleration and thereby prevent the fall of a workman from height. The device includes a runner through which a safety line can be threaded, balls which serve as line-gripping members and a wedge means for wedging the balls against the safety line. The device does not continuously grip or restrain the cable but does so only upon rapid acceleration of the runner.

One type of prior art cable snubber which has been used in underwater prospecting is formed from a solid cylinder of rubber or polyamide polymer, such as nylon. A hole is bored axially through the solid cylinder forming a passage with a surrounding wall. The cross sectional area of the passage usually is circular with a diameter slightly larger than, but approximately the diameter of, the cable to be restrained. A cable to be restrained is then threaded through the snubber. Since the cable diameter and bored hole diameter are approximately the same, the cable fits snugly. Any relative motion between the cable and the snubber is resisted by the frictional force generated between the outer surface of the cable and the surface of the passage through the snubber. A problem with this type of snubber is that the resistive frictional force abrades away the rubber or polymer material of the snubber wall, thereby increasing the diameter of the passage and reducing the restraining ability of the snubber.

SUMMARY OF THE INVENTION

The present invention solves this problem by using flexible, brush-bristle like members in a snubber to contact the cable surface and provide the resistive frictional force. The cable is restrained by the friction which occurs between the flexible members and the cable surface upon onset of movement between the cable and the flexible members. The flexing characteristic of the contacting members greatly reduces the abrading or wearing away of the material forming the snubber wall while providing a smooth and continuous application of the restraining force to the cable.

BRIEF DESCRIPTION OF THE DRAWINGS

In the drawings, wherein like reference numerals refer to like parts and wherein illustrative embodiments of this invention are shown:

FIG. 1A is an axial cross-sectional view of the apparatus used in the preferred embodiment.

FIG. 1B is a longitudinal cross-sectional view of the apparatus used in the preferred embodiment.

FIG. 1C shows a portion of the outer surface of the preferred embodiment of the invention.

FIG. 5 is a partial cross-sectional pictorial perspective of an alignment means for aligning a cable along the axis of the cable snubber.

DETAILED DESCRIPTION OF THE INVENTION

Figure 2:
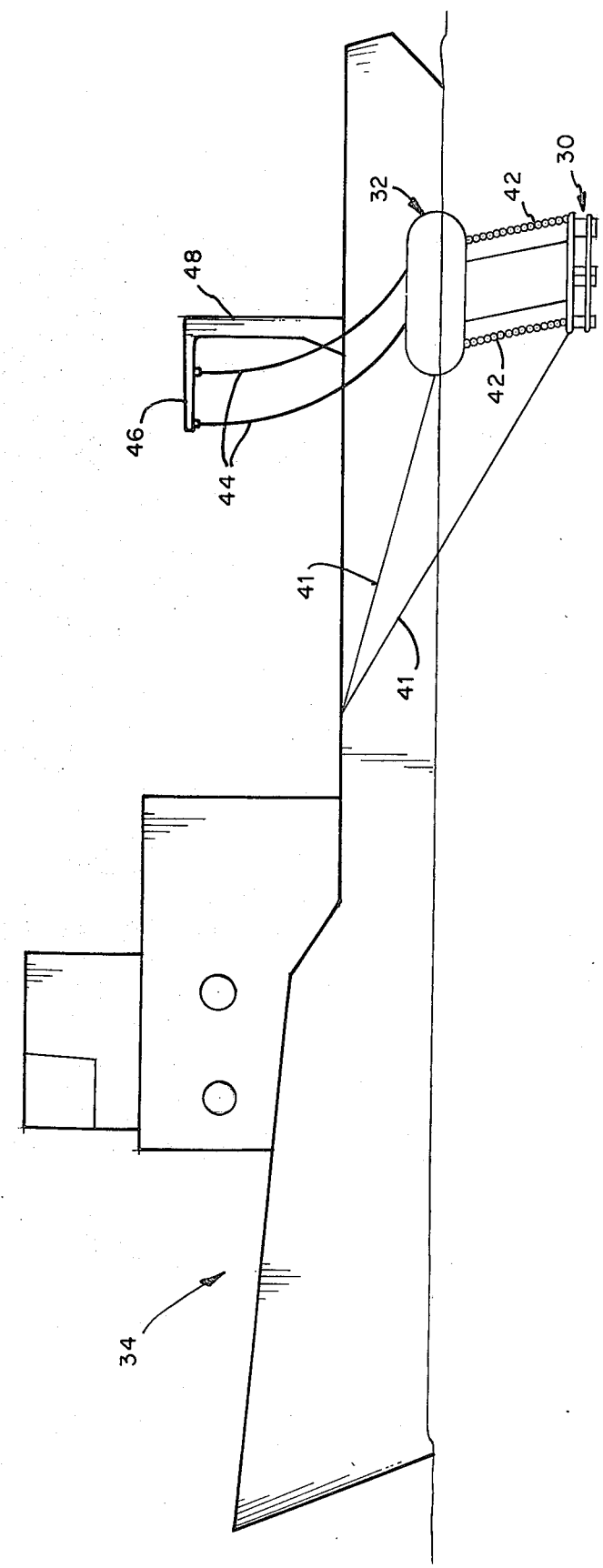
FIG. 2 is a pictorial perspective view of a ship towing a float and seismic source while performing underwater prospecting.

The invention includes embracing the cable to be restrained with a sleeve. The sleeve may be formed from a single block of material or by mating two or more polygonal or arcuate sleeve sections. Referring to FIG. 1A, there is shown a longitudinal cross-sectional view, in FIG. 1B an axial cross-sectional view, and in FIG. 1C a pictorial drawing of a portion of the outer surface of a preferred embodiment of the invention. The preferred embodiment is a cylindrical sleeve formed by mating two semicylindrical sleeve sections 10. Each sleeve section 10 has an outer surface 12 and an inner surface 14 with the volume between the surfaces forming a sleeve wall 15. As shown in FIGS. 1A and 1C, a plurality of channels or grooves 16 run the length of the outer surface 12 of sleeve wall 15. The purpose of these grooves is to contain the wires used as securing means as discussed below and to protect them from external abrasive forces. The grooves are parallel to the axis of sleeve section 10 and are parallel to each other. The grooves are spaced evenly about the circumference of the outer surface 12. A plurality of passageways 18 pass from the grooves 16 through the sleeve wall 15 to the inner surface 14 in a radial direction with respect to the mated sleeve sections. In the preferred embodiment, the passageway 18 intersecting one particular groove are bored through the sleeve wall such that they are generally evenly spaced along the length of each such groove and are parallel with respect to each other. In addition, the passageways intersecting a single particular groove are positioned along the length of such groove so as to be longitudinally offset with respect to the passageways in an adjoining groove by approximately one-half of the spacing distance between passageways in a single groove.

A plurality of flexible members 20, such as wires, are placed in each passageway such that their exposed ends 22 extend inwardly from the inner surface 14 towards and to the center of sleeve section 10 as shown in FIGS. 1A and 1B. In the preferred embodiment, wires of approximately equal lengths with lengths approximately equal to the diameter of the mated sleeve section are folded in half with the folded portions constituting the unexposed ends 24. The unexposed ends 24 of the plurality of flexible members 20 are attached to a securing means 26. The securing means 26 serves to retain the unexposed ends 24 of the flexible members in place in the passageways. In the preferred embodiment, a securing means 26 is a length of wire which is threaded through and around the unexposed ends 24 of a plurality of the folded lengths of wire, looped through two or more passageways 18 and tied. The portion of the length of wire used as the securing means 26 which is thus looped about the outer surface 12 of a sleeve section 10 is placed in a groove 16 to protect it from external abrasion as shown in FIG. 1C. The exposed ends 22 of the flexible members 20 in the preferred embodiment are suggestive of the bristles of an artist's paint brush. With the unexposed ends 24 positioned and secured in a passageway 18, the exposed ends 22 extend from the inner surface 14 to the longitudinal axis of the mated sleeve sections.

When the two sleeve sections 10 are mated in an embracing relation about a cable, the exposed ends 22 of the flexible members are in contact with the outer surface of the cable. Any movement of the cable through the sleeve will be resisted due to the frictional force caused by the exposed ends 22 rubbing against the outer surface of the cable. In this manner movement of the cable through the sleeve section will be restrained. The flexible quality of members 20 permit the exposed ends to bend in a resilient manner and results in a smooth application of resistive force to the cable as the cable moves relative to the flexible members 20.

The dimensions of the invention are determined primarily by the diameter of the cable to be restrained. For example, to restrain a steel cable of 0.5 inches in diameter, preferred embodiments of the invention with the following dimensions and characteristics has been used successfully: sleeve sections 10 of nylon or brass which when mated form a cylindrical sleeve with an outside diameter of three (3) inches; a sleeve wall thickness of 9/16 inch and a sleeve section length of 6 inches; the flexible elements were of 0.020 inch diameter crimped stainless steel wire of 2.5 inch lengths; the passageways were 0.12 inch diameter, spaced 0.5 inches apart in each groove and bored in a plane perpendicular to the axis of the sleeve section; the grooves were 0.10 inch deep and 0.15 inch wide and were spaced about the circumference of the outer surface at 30 degrees of arc intervals; each securing means was of 0.030 inch diameter stainless steel wire of approximately 8.0 inch length; each flexible member was bent and folded at its mid-length to form an eye; approximately 30 flexible members were positioned and secured in each passageway by gathering together the eyes of the flexible members, threading the securing means through each of the eyes and through a passageway and through an adjacent passageway in a loop fashion, and tieing together the ends of the wire used as the securing means.

Figure 3:
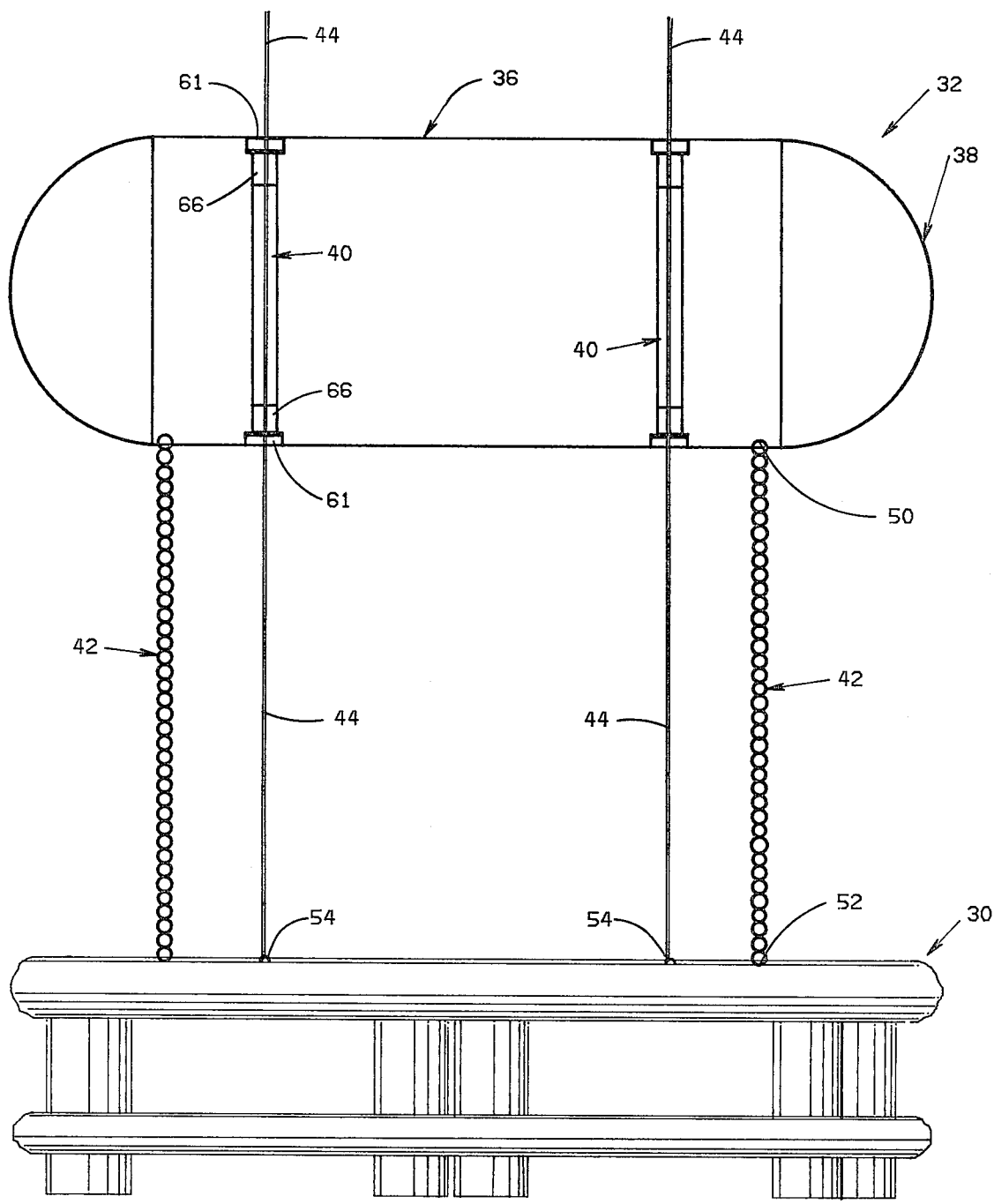
FIG. 3 is a cross-sectional view of a float showing the relationship of the float to the present cable snubber.

In order to better appreciate the advantages of the invention, its use in a particular application, namely underwater seismic prospecting, will now be described. Typically in performing underwater seismic prospecting, a seismic source 30 and float 32 are carried by ship 34 as shown in FIG. 2 to a location above the sea floor to be prospected. For purposes of example, a typical float 32 as shown in FIG. 3 might consist of a generally cylindrically shaped volume formed by a pipe section 36 of about eleven (11) feet in length and having an outer diameter of four (4) feet with each end of the pipe being sealed by caps 38 which are welded thereon. Extending through the float, typically diametrically of the pipe section, are one or more parallel, straight, hollow tubes 40. The tubes 40 are suitably sealed with respect to the interior of the pipe section so as not to allow water to enter the interior of the float when the float is immersed. The purpose of these tubes 40 is to permit a path through the float through which lifting cables attached to the seismic souce may travel so as to lower the source beneath the float as discussed below while the float remains buoyant.

Once at the desired location, the seismic source 30 is connected to the float 32 by one or more cables or chains referred to as support chains 42. Each support chain 42 is attached to a bracket 50 affixed to a side surface of the float and to a connecting means 52 on the upper side of the seismic source. Generally, the length of chain which extends from bracket 50 to connecting means 52 is the same for each of the support chains 42 and is equal to the depth at which it is desired to position and suspend the seismic source beneath the float. A typical depth beneath the float at which the source is suspended might be thirty 30 feet. The support chains are attached to the seismic source such that the seismic source, when submerged beneath the water's surface and suspended beneath the float, has the desired orientation with respect to the subaqueous floor to be prospected.

Also connected to the seismic source are one or more lifting cables 44. For ease of description, the use of the invention with respect to only one such cable will be described, it being understood that typically two or more such cables are used. One end of each lifting cable is attached to a conventional cable reel mechanism 46 which is part of a rotatable, deck-mounted crane or davit 48. The crane or davit is of the type which has a load arm which may be rotated or swung relative to the deck of the ship so that the load arm will project out over the water and a load may be lowered into the water. With the load arm of the crane positioned above the seismic source each lifting cable 44 is unwound a length sufficient to readily travel the length of the load arm of the crane, then down to the float which is stowed on the ship's deck, be threaded through one of the tubes 40 which extends through the float, and then be attached to bracket 54 on the upperside of the seismic source which is also stored on the ship's deck. It is important that the lifting cables 44 be threaded in the same direction, i.e. top to bottom, through the tubes (40) of the float before being attached to the seismic source.

Figure 4:
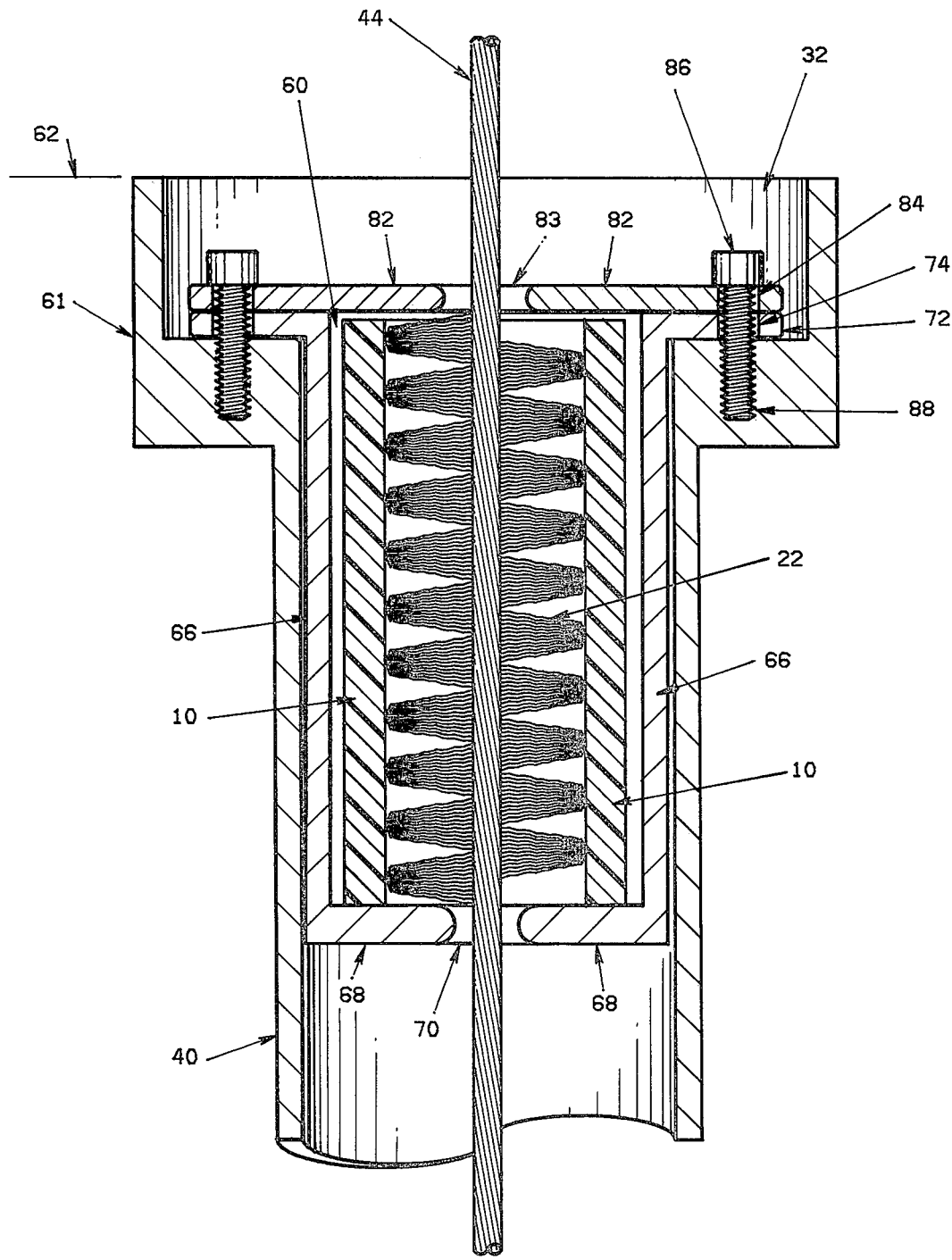
FIG. 4 is a cross-sectional view of the installation of the snubber apparatus used in the preferred method for underwater seismic prospecting.

In the preferred embodiment, the cable snubbing apparatus is attached to the float. Referring to FIG. 4 there is shown a crosssectional view of the float 32 and a tube 40 running diametrically through and across the float's interior. The mouth 60 of tube 40 is sealed by means of a flange 61 welded to an opening in the surface 62 of the float 32 so as to prevent water from entering the interior of the float. A snubber cup for containing the cable snubbing apparatus is inserted into tube mouth 60. In the preferred embodiment the snubber cup is a cylindrical sleeve formed by a two semi-cylindrical shell sections 66, each of which has a semi-circular base 68, a semi-circular annular groove or notch 70 in the base 68, and at the end opposite the base a semicircular mounting flange 72. Concentrically around the flange 72 are a plurality of holes 74 through the flange for accepting mounting bolts 86 for securing the shell section 66 to the flange 61 of the tube mouth 60. The diameter and length of the inside of the snubber cup are selected so that the mated sleeve sections 10 will fit snugly within the cup formed by the mated shell sections 66. When the shell sections 66 are mated to form a snubber cup, the hole in the cup base formed by annular grooves 70 has a diameter larger than the diameter of the lifting cable to be restrained.

After the lifting cable 44 has been threaded through tube 40, the two shell sections 66 are mated together about the lifting cable and inserted into the tube mouth 60. The two sleeve sections 10 are then mated together about the lifting cable and inserted into the interior region of the mated shell sections 66. Since the two mated sleeve sections 10 fit snugly in the snubber cup formed by shell sections 66, it is not necessary that the sleeve sections 10 be fastened together as with bolts. Rather they may be placed about the cable and slid down into the snubber cup. A cap which in the preferred embodiment is formed from two semi-circular cap sections 82, is placed on flange 72. The cap serves to retain the mated sleeve sections 10 within the snubber cup and to align the cable along the longitudinal axis of the mated sleeve sections 10. Each cap section 82 has a groove or notch 83 and has holes 84 drilled circumferentially about its surface which correspond to and communicate with flange holes 74. The cap sections 82 and cup shell sections 66 are affixed to the float by means of mounting bolts 86 which pass through holes 84 and cup flange holes 74 to holes 88 in the tube flange 61. When the cap sections 82 are mated and affixed to the float, a cap hole is formed by notches 83 through the center of the circular cap. This cap hole and the hole in the base of cup 64 formed by notches 70 serve to keep the lifting cable aligned along the axis of sleeve sections 10. This permits the cable to be in maximum contact with the exposed ends 22 of the flexible members and therefore produces the greatest frictional restraining force on the lifting cable.

Other cable alignment means may be used instead of or in conjunction with the means described. For example, a roller assembly can be attached to sleeve sections 10 as shown in FIG. 5. Referring to FIG. 5 there is shown a roller assembly which includes two rollers 91 whose axes of rotation parallel one another. The rollers 91 are positioned in channels 93 so as to be placed on opposite sides of cable 44. It also includes a similar pair of rollers 92 whose axes of rotation are parallel to each other and which are positioned in channels 94 so as to be placed on opposite sides of cable 44. The axes of rotation of rollers 91 are perpendicular to the axes of rotation of rollers 92 and are in a plane parallel to the plane in which lie the axes of rotation of rollers 92. The rollers are retained in the channels 93 and 94 by ordinary snap-rings which are not shown in the drawing for the sake of clarity. The channels are formed by semiannular grooves in quarter-cylindrical housing sections 95, 96, 97 and 98. The housing sections are attached to sleeve sections 10 and the rollers 91 and 92 are kept in perpendicular alignment with respect to each other by one or more housing pins 99. The roller assembly aids in aligning the cable along a path which will produce the greatest contact with the exposed ends 22 of the restraining means and hence result in maximizing the restraining force applied to the cable. An advantage of using such roller means is that abrasion of the cable by notches 83 and notches 70 is greatly reduced.

Prior to placing the seismic source and the float into the water, one or more towing cables 41 attached to the towing ship are attached to the source and to the float as shown in FIG. 2 for towing the source and float through the water to and over the area to be prospected.

The seismic source and float simultaneously are lifted from the deck, swung out over the water and lowered to the water surface by means of the lifting cables 44. As the cable reel 46 is unwound, the float remains at the surface due to its buoyancy and the seismic source is lowered beneath the float. The weight of the seismic source is much greater than the sum of the frictional forces exerted on the lifting cables by the cable snubbers. Therefore the seismic source can be lowered to a depth beneath the float equal to the length of the support chains. When such depth is reached, the weight of the seismic source will be supported entirely by the float and support chains. Further unwinding of the cable reel causes slack to occur in the lifting cables because the seismic source will remain suspended at a fixed depth beneath the float determined by the length of the support chains. Slack will occur in the portion of each lifting cable which lies between the cable reel mechanism and the snubber. The frictional force exerted on each lifting cable by the snubber through which the cable passes will exceed any pulling force on the underwater portion of the cables caused by the movement of the cable through the water as the ship tows the float and source. Thus slack may be maintained in the above water portion of each lifting cable between the float and the crane or davit sufficient to prevent such portion of lifting cable from becoming taut or being placed in tension as the towing ship heaves and moves relative to the float. This will prevent chafing or abrading of the float by the cable and will prevent breaking the lifting cable should the ship or float experience sudden movement relative to one another.

While the preferred embodiment of the invention has been described as including semi-cylindrical elements, it is apparent that the scope of the invention is not limited to semi-cylindrical elements. The sleeve section, for example, may be formed from a single element. However one advantage of using two or more arcuate or polygonal sections to form the sleeve and the snubber cup is to provide any easy method of installing the cable snubber. Using two or more arcuate or polygonal sections permits the user of the invention to position the sleeve section about a cable without having to disconnect one end of the cable and thread it through the sleeve. Using two or more sections also permits use of the invention to restrain a cable which has a large fitting or connector affixed to it without having to remove the connector in order to thread the cable through the snubber.

The foregoing disclosure and description of the invention are illustrative and explanatory thereof, and various changes in size, shape and materials, as well as in the illustrated construction may be made within the scope of the appended claims without departing from the spirit of the invention.

What I claim is:

1. In towing a floating vessel by a ship wherein a cable, which is not used to tow the vessel, is in communication with the ship and the floating vessel such that an exposed portion of the cable extends from the ship to the vessel and a second portion of the cable passes through the structure of the vessel, the improved method for maintaining slack in the exposed portion of the cable comprising the steps of
    attaching a plurality of flexible elements to a sleeve with the exposed ends of the flexible elements extending from the wall of the sleeve inwardly into an annulus formed by the inner surface of the sleeve in contact with the surface of the second portion of the cable,
    placing the sleeve in an embracing relation about the second portion of the cable such that the second portion of the cable extends through the annulus of the sleeve, and
    affixing the sleeve to the vessel.

2. The method of claim 1 wherein placing the sleeve includes connecting at least two arcuate sleeve sections.

3. The method of claim 1 wherein placing the sleeve includes connecting at least two polygonal sleeve sections.

4. The method of claim 2 or claim 3 wherein attaching a plurality of flexible elements to the sleeve includes securing bristles made of wire.

5. The method of claim 1 wherein
    placing the sleeve includes mating together two semi-cylindrical sleeve sections and aligning the second portion of cable along the axis of the annulus of the sleeve, and
    attaching a plurality of flexible members includes affixing bristles made of wire.

6. An improved method for positioning and moving a seismic source underwater while maintaining the source at a selected subsurface depth comprising the steps of
    connecting a support cable to a buoyant vessel and to a seismic source such that the length of cable between the vessel and the source is equal to the selected subsurface depth when the source is suspended from the vessel and freely supported by the support cable,
    threading one end of a lifting cable wound around a cable reel mechanism attached to a crane onboard a ship carrying the buoyant vessel through the buoyant vessel from the unsubmerged or top side to and through the submerged or bottom side,
    attaching said end of the lifting cable to the seismic source,
    attaching a plurality of flexible members to the inner surfaces of at least two sleeve sections so that the flexible members extend inwardly therefrom,
    connecting the sleeve sections in an embracing relation about a portion of the lifting cable and bringing said flexible members in contact with said portion of the lifting cable,
    attaching said sleeve sections to the buoyant vessel,
    lifting by means of the lifting cable and crane the buoyant vessel and source from the ship,
    lowering by means of the lifting cable and crane the buoyant vessel and source into the water until the buoyant vessel floats at the surface, unwinding the cable reel mechanism until the source is lowered by the lifting cable to the selected subsurface depth beneath the buoyant vessel, and increasing the length of the portion of the lifting cable which extends from the crane to the buoyant vessel by an amount sufficient to reasonably ensure that slack will remain in said portion of the lifting cable which extends from the crane to the buoyant vessel as the ship and buoyant vessel move and heave relative to one another.

7. The method of claim 6 wherein attaching a plurality of flexible members includes affixing bristles made of wire.

8. The method of claim 7 wherein connecting at least two sleeve sections includes mating two semi-cylindrical sleeve sections.

* * * * *